Dec. 21, 1954

Filed Nov. 7, 1951

R. L. JAESCHKE
MAGNETIC SLIP COUPLING CONTROL
USING A MAGNETIC AMPLIFIER 2,697,794

2 Sheets-Sheet 1

Ralph L. Jaeschke
Inventor.
Koenig and Pope,
Attorneys.

Dec. 21, 1954

R. L. JAESCHKE
MAGNETIC SLIP COUPLING CONTROL
USING A MAGNETIC AMPLIFIER 2,697,794

Filed Nov. 7, 1951

2 Sheets-Sheet 2

Ralph L. Jaeschke,
Inventor.
Koenig and Pope,
Attorneys.

2,697,794

MAGNETIC SLIP COUPLING CONTROL USING A MAGNETIC AMPLIFIER

Ralph L. Jaeschke, Kenosha, Wis., assignor, by mesne assignments, to Eaton Manufacturing Company, Cleveland, Ohio, a corporation of Ohio Application November 7, 1951, Serial No. 255,180

7 Claims. (Cl. 310—95)

Figure 1:
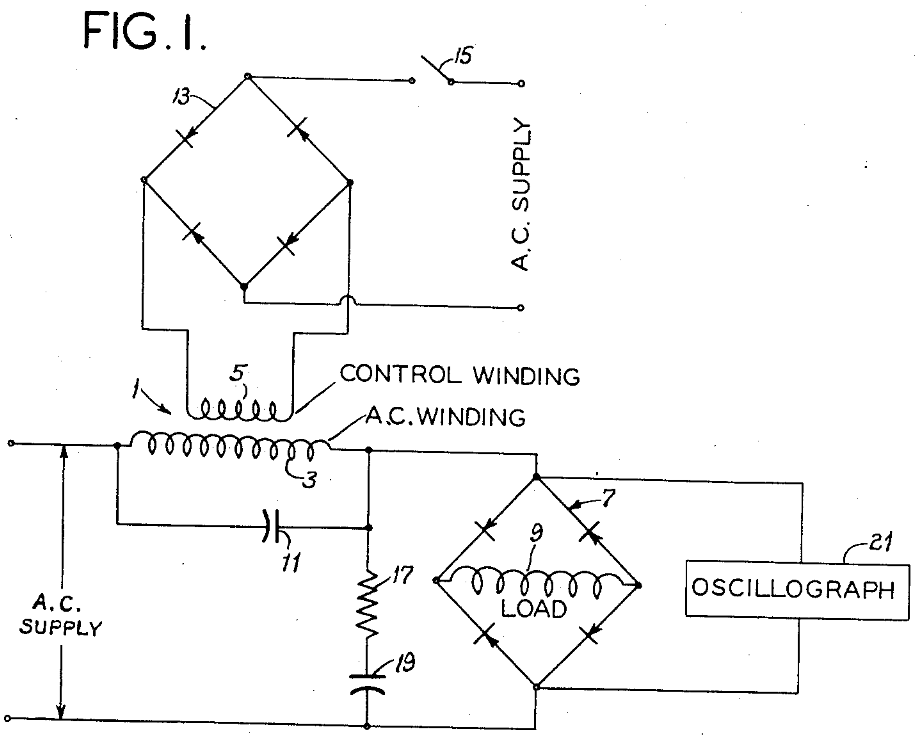

This invention relates to magnetic amplifiers and more particularly constitutes an improvement upon the saturable reactor type regulator disclosed in my United States Patent No. 2,551,839, issued May 8, 1951.

Among the several objects of this invention is the provision of a control of the saturable reactor or magnetic amplifier type having an improved time response to control signals; the provision of such a control having a wide range of control; and the provision of a control system for electrical machines such as eddy-current slip couplings and the like, which provides for torque-limiting as well as speed-regulating action.

One of the problems encountered in the use of magnetic amplifiers is the comparatively large time delay in the response of the main winding to control signals impressed across the control winding. Although various solutions have been proposed, they leave something to be desired. For example, the addition of resistance in series with the control winding will reduce the time delay, but the losses in the resistance disadvantageously reduce the amplification of the magnetic amplifier. Although this may be corrected to some extent by feed-back and self-excitation, such corrections in themselves tend to increase the time delay. The solution I propose is connecting a capacitor and a resistor in series with one another across the load and in series with the main winding of the magnetic amplifier. It is to be noted that this capacitor should not be confused with a capacitor connected in series with both the load and main winding to induce line frequency series resonant effects which extend the upper range of control. As will be further explained, it is believed that my capacitor induces saturation of the magnetic amplifier for a brief period corresponding approximately to the time delay of the control winding, and the resistor is employed to avoid oscillation and excessive shorting effects across the load during the initial response of the capacitor to decreasing voltage across the magnetic amplifier.

The control system for electrical machines referred to comprises a power circuit having the main winding of a magnetic amplifier connected therein to vary current supplied to a field coil of the electrical machine. A variable D. C. control signal is impressed across the control winding of the magnetic amplifier, which signal is provided by a speed-responsive voltage source which is connected in series opposition with a speed-setting reference source. The speed-setting reference source is in turn supplied with a signal obtained from a second magnetic amplifier circuit, which also has a control winding. The second control winding is supplied with a load-responsive control signal obtained by connecting a voltage source responsive to the torque on the machine in series opposition with a torque-setting voltage source. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

Figure 4:
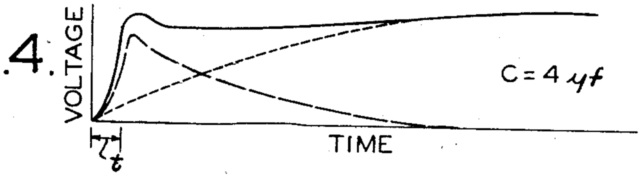
Figure 5:
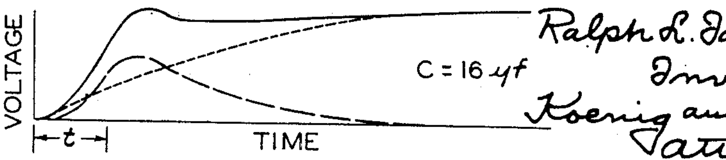
Figure 6:
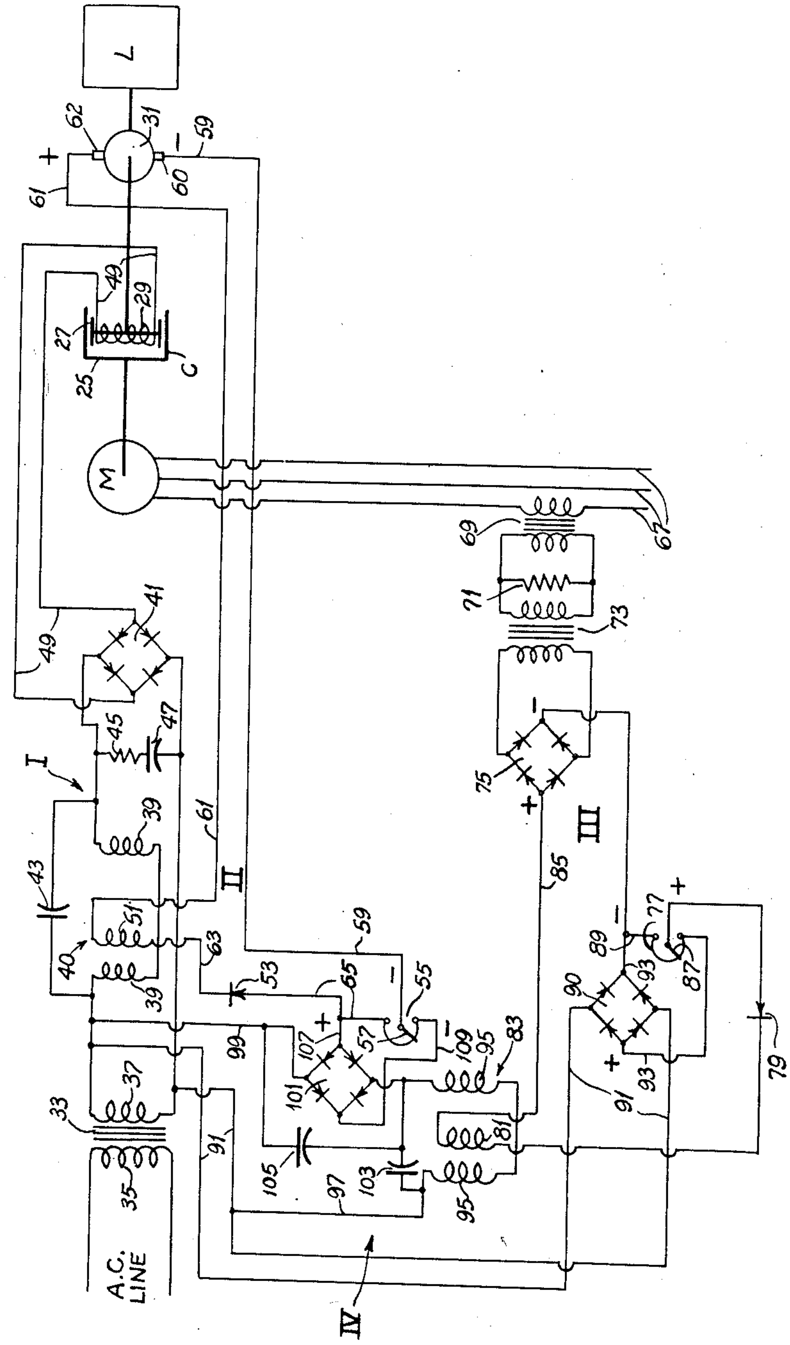

In the accompanying drawings, in which one of various possible embodiments of the invention is illustrated, Fig. 1 is a circuit diagram illustrating certain features of the invention;

Figs. 2–5 are plots of load voltage as a function of time for various values of capacitance at one of the capacitors shown in Fig. 1; and Fig. 6 is a circuit diagram of a control system providing torque-limiting and speed-regulating action.

Similar reference characters indicate corresponding parts throughout the several views of the drawings.

Said Patent No. 2,551,839 discloses a control circuit wherein there is shown a capacitor (labeled 29) connected in series with the main winding and across the load for the stated purpose of extending the control range at the lower levels. It is suggested that the capacitor acted as a low impedance to by-pass current around the load, and that its capacitance should be selected accordingly. I have now discovered such a capacitor can have the additional advantage of greatly reducing the time delay of a magnetic amplifier, but that for this purpose, the character and arrangement of the capacitor is to be determined by additional considerations, as will be explained.

Referring to Fig. 1 of the drawings, there is shown a circuit upon which tests were conducted for the purpose of ascertaining the variation in time-response performance occasioned by the use of the above referred to capacitor across the load. The circuit includes a magnetic amplifier 1 having an A. C. main power winding 3 and a D. C. control winding 5. The power winding 3 is series connected with an A. C. power supply as indicated and with the A. C. input terminals of a bridge rectifier 7. An inductive load 9, such as the field coil of an electrical machine, is connected across the output of the bridge rectifier 7 so as to be variably excited thereby. Connected across the power winding 3 is a capacitor 11 of a size adapted to produce parallel resonance at the line frequency when the input to the control winding is zero. This is in accordance with the teachings of said patent.

The power supplied to the load 9 is under the control of the winding 5. Although normally the input to a magnetic amplifier is varied through a certain range, in this instance a switch-controlled input was employed in order to ascertain the time response to sudden changes in the input. A bridge rectifier 13 has its output connected across the control winding 5 and is supplied through a switch 15 by a suitable A. C. power supply. An oscillograph 21 is connected to the bridge rectifier 7 for the purpose of measuring the voltage across it as a function of time upon closing of the switch 15.

A resistor 17 and a capacitor 19 form a series combination or branch which is connected across the input to the bridge rectifier 7 and in series with the main winding 3. I discovered that if different values of capacitance 19 are selected, the time response of the system varies with the size of this capacitor 19. Figs. 2–5 are representative graphic records made by the oscillograph 21 upon closing of the switch 15 for different sizes of the capacitor 19. It will be understood that the graphic indications indicate voltage in terms of peak or R. M. S. values, inasmuch as the voltage across the bridge 7 is actually a 60 cycle A. C. voltage. It will be seen that the time required for the voltage at the load to build to full value is considerable if there is no capacitance at 19. As the capacitance at 19 is increased, there is a considerable reduction in the time response and then a gradual increase again. In this instance, a minimum time delay of about .07 second was obtained with a capacitance of 4 microfarads for capacitor 19, where the capacitor 11 had a value of 1.2 microfarads.

It is believed that the improved time response of this circuit may be explained by the possibility that this reactor is temporarily saturated by an abnormally large current briefly drawn through the main winding 3 of the reactor by the capacitor 19 upon a change in the voltage normally across the capacitor 19. Under normal steady-state conditions, the capacitor 19 stores and releases a predetermined amount of energy at the rate of the line frequency; hence it may be said that there is no change in the peak A. C. voltage across the capacitor or in the energy level of the capacitor. Upon a change in the voltage supplied to the capacitor, a large current is temporarily drawn by the capacitor so that the capacitor can adjust itself to the new level of energy.

Figure 2:
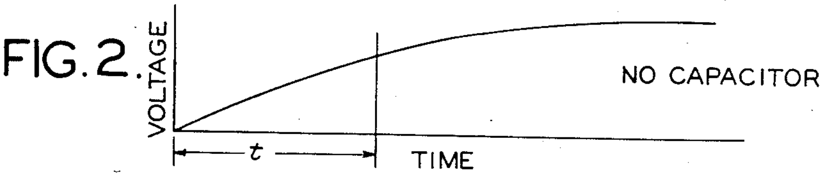

Referring to Fig. 2, it is shown that there is a considerable time delay in the build up of the load across the load rectifier 7 in the absence of a capacitor as at 19. Under these circumstances, the impedance of the main winding 3 decreases gradually, because the reactor is relatively slowly saturated by the control winding, the exciting current in the control winding being unable to increase suddenly because of its inductance.

Figure 3:
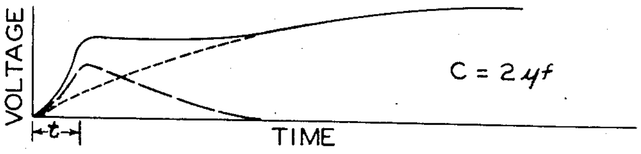

When a capacitor 19 is added, the time delay is reduced considerably, for example, by a factor of eight or more over that of Fig. 2. Figs. 3, 4 and 5 illustrate this relationship. Referring to Figs. 3, 4 and 5, the time delay characteristic has been resolved into two components. The dotted line represents the slowly increasing saturation of the reactor and decreasing impedance of the main winding as the reactor is relatively slowly saturated by the control winding alone, as indicated in Fig. 2. When there is a tendency for the voltage across the capacitor to change, however, an abnormally large current is drawn for a brief time, the size of this large current being sufficient to saturate the reactor and cause the impedance of the main winding to drop substantially. The voltage drop across the main winding decreases rapidly, and substantially full voltage then appears across the remainder of the circuit, in this instance the bridge rectifier 7. The effect of this temporary saturating current is represented by the dashed lines in Figs. 3–5.

The rising portion of the dashed line represents the relatively more rapid increase in the saturation of the reactor and consequent rapid decrease in impedance of the main winding 3 as the reactor is saturated by an abnormally large current drawn to raise the energy level of the capacitor. As the capacitor 19 adjusts itself to the new voltage, the current drawn thereby tends to return to normal values, and the saturation of the reactor in turn gradually decreases with a consequent increase in its impedance. The saturation of the reactor, however, in the meantime has been increased substantially by the increasing current to the control winding, this being indicated by the dotted line, so that the composite effect is one of a quick rise in the voltage across the rectifier.

Inasmuch as the critical value of capacitance at 19 that produces the best response performance is a complex function of the inductances of the reactor and the resistance 17, the proper value is difficult to predict theoretically and is more readily determined empirically. According to the above-stated theory, a sufficient current must be drawn by the capacitor to induce saturation for a substantial time. An excess current, however, is undesirable because the shorting effect of the capacitor would tend to counteract the desirable saturating effect. That is, too large a capacitance would tend to starve the load during the initial period of the capacitor's adjustment to the rising voltage.

Balanced against these effects are those of the resistor 17, which limits the current drawn by the capacitor. The resistor helps to prevent shorting of the load, yet should not be so large as to prevent saturation. The values of the capacitor 19 and resistor 17 should therefore be chosen with a view to inducing saturation without producing an excessive shorting effect during the initial response of the capacitor to a decreasing voltage across the main winding of the magnetic amplifier. The resistor also serves to damp oscillations which might tend to occur from the series combination of the inductance 3 and the capacitance 19.

In said Patent No. 2,551,839, there is shown a control system adapted to provide speed regulation. Fig. 6 hereof illustrates a control system affording torque-limiting as well as speed-regulating action. An A. C. induction motor M is arranged to drive a load L through an electric coupling C, as for example an eddy-current slip coupling. Such a coupling is known in the art and is herein shown to have a driving inductor member 25 mechanically coupled to the motor M and a driven field member 27 mechanically coupled to the load L. The field member 27 carries a field coil 29, which is variably excited by the control of this invention to vary the driven speed of the coupling. A D. C. generator 31 is also mechanically coupled to the driven member 27 and the load L for the purpose of supplying a speed-responsive signal to the control system.

The control includes a transformer 33, preferably of the well-known voltage-regulating type in the event the generator 31 is of the permanent magnet type. A conventional transformer may be used at 33 with good results provided a shunt-field type generator is used with its field excited by the transformer 33 in the manner shown in my copending U. S. patent application for Speed Control System, Serial No. 217,604, filed March 26, 1951.

A primary 35 of the transformer 33 is connected to a suitable A. C. power supply. A secondary 37 of the transformer 33 is in a power circuit I which includes a main winding 39 of a magnetic amplifier 40 and the A. C. input terminals to a bridge rectifier 41. The circuit also includes capacitors 43 and 47 and a resistor 45 which correspond, respectively, to the capacitors 11 and 19 and the resistor 17 already mentioned. Further details of these elements are not repeated. The D. C. output terminals of the bridge rectifier 41 are connected at 49 to the field coil 29 of the coupling.

The excitation of the field coil 29 is controlled by varying the saturation of the magnetic amplifier. The saturation of the magnetic amplifier is under control of a D. C. control winding 51, which is connected in a control circuit II including in series the generator 31, a rectifier valve 53 and an adjustable portion of a speed-control rheostat or voltage divider 55. The rheostat 55 has an adjusting arm 57 connected at 59 to a negative brush 60 of the generator 31. The generator 31 has its positive brush 62 connected at 61 to one terminal of the control winding 51 for the magnetic amplifier. The other terminal of the control winding 51 is connected at 63 through the rectifier valve 53 and conductor 65 to one fixed terminal of the rheostat 55.

The speed-control rheostat 55 supplies an adjustable speed-setting reference voltage which is responsive to the load on the motor M. As shown, the motor M is supplied through power supply lines 67. This motor is a typical three-phase induction motor so that the torque transmitted thereby is relatively proportional to the current drawn through the supply lines 67. This current is measured by a current transformer 69 connected in one of the lines 67 and feeding across a resistor 71 to a step-up transformer 73. The transformer 73 in turn is connected across the A. C. input terminals of a bridge rectifier 75.

In the case of small motors where the power factor causes the motor current to remain somewhat constant over a considerable torque range, it may be desirable to use a watt-meter type of control as a substitute for the current transformer 69. Such a control is shown in the U. S. Patent No. 2,469,706, for Electronic Tension Control Apparatus.

The D. C. output terminals of the bridge rectifier 75 are connected in a torque-setting circuit III including an adjustable portion of a torque-setting potentiometer or voltage divider 77, a rectifier valve 79 and a control winding 81 of a second magnetic amplifier 83. One output terminal of the bridge rectifier 75 is connected via wire 85 to one terminal of the control winding 81, and the other terminal of the control winding 81 is connected through the valve rectifier 79 to an adjusting arm 87 of the potentiometer 77. This circuit is completed by a connection 89 to the other output terminal of the bridge rectifier 75; the arrangement being such that the conductor 85 is relatively positive with respect to the connection 89.

A fixed D. C. voltage is impressed across the potentiometer 77. As shown, a bridge rectifier 90 is supplied with A. C. power by conductors 91 connected to the secondary 37 of the transformer 33. The D. C. output terminals of the rectifier 90 are connected at 93 across the fixed terminals of the potentiometer 77, the polarity of the conductors 93 being such that the connection 89 is negative with respect to adjusting arm 87. Consequently, the D. C. torque-responsive voltage supplied by the bridge rectifier 75 is in series opposition with the adjustable D. C. voltage supplied at the potentiometer 77 by the bridge rectifier 90. The rectifier valve 79 is connected in a direction so that current flows only when the torque-responsive D. C. voltage is overridden by the adjustable reference voltage. The net differential signal is amplified at 83 and fed to the speed-control rheostat 55 by a reference voltage circuit IV.

The magnetic amplifier 83 has main windings 95 supplied by conductors 97 and 99 connecetd across the transformer secondary 37. The conductor 99 is connected through the A. C. input terminals of a bridge rectifier 101 to the main winding 95. Capacitors 103 and 105 are connected in a manner heretofore described to improve the performance of the magnetic amplifier.

The D. C. output terminals of the bridge rectifier 101 are connected across the fixed terminals of the speed-control rheostat 55. A positive connection 107 is made to the conductor 57, and a relatively negative connection 109 is made to the other fixed terminal of the rheostat 55. The arrangement is such that the D. C. voltage of the generator 31 is in series opposition with the D. C. voltage supplied by the speed-setting rheostat 55; and the valve 53 is arranged so that the current flows only when the speed-setting voltage overrides the speed-responsive voltage supplied by the generator 31.

Speed-regulating action is similar to that obtained in said Patent No. 2,551,839. For example, should the speed at which the load is driven decrease as the torque developed by the load increases, the output of the D. C. generator 31 decreases. This results in an increase in the differential voltage impressed across the control coil 51, and a consequent increase in saturation. The impedance of the main winding 39 is decreased, and the excitation of field coil 29 is consequently increased to increase the speed of the driven member 27. Variations in speeds are thus corrected by the speed-regulating action of this control. The speed-regulating action, however, is overridden by the torque-limiting action of the control.

An adjustable portion of the output from the bridge rectifier 90 is impressed across the control coil 81 for the amplifier 83. This is opposed by the torque-responsive voltage developed by the bridge rectifier 75. Therefore, the load on the motor M is controlled by the setting of the potentiometer 77. As the load on the motor tends to exceed this value, the output of the bridge rectifier 75 increases to effect a reduction in the differential voltage appearing across the control coil 81, the main windings 95 increasing impedance because of the reduced level of saturation. The D. C. voltage developed by the bridge rectifier 101 then decreases so that the reference voltage supplied by the speed-control rheostat 55 decreases. This in turn effects a net reduction in the excitation of the field coil 29 for the coupling, and prevents the load on the motor from rising above the predetermined desired value.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a control for an electrical machine having a field coil, a first magnetic amplifier having an A. C. power winding and a D. C. control winding, first rectifier means connected to supply D. C. power to the field coil of the electrical machine, an A. C. power circuit connected to the rectifier means, the A. C. winding of said first magnetic amplifier being series-connected in the A. C. power circuit, a D. C. speed-control circuit connected to the control winding of the first magnetic amplifier, said speed-control circuit including a D. C. voltage source responsive to the speed of the electrical machine and D. C. voltage means providing an adjustable speed-setting reference voltage responsive to the load on the machine, and a branch circuit shunt-connected across the rectifier means, said branch circuit consisting of capacitor means and resistor means connected in series with one another.

2. A control as set forth in claim 1, wherein the load-responsive voltage means comprises a second magnetic amplifier having an A. C. power winding and a D. C. control winding, a load control circuit connected to the control winding of the second magnetic amplifier, the load control circuit including in series opposition a first D. C. voltage source providing a voltage responsive to the load on the electrical machine and an adjustable torque-setting D. C. voltage, the A. C. winding of the second magnetic amplifier being connected in a rectifying circuit to provide a D. C. voltage responsive to the difference between said first and second voltage sources, and said rectifying circuit being connected to the speed-control circuit for the control winding of the first magnetic amplifier.

3. In a control for an electrical slip coupling having a field coil and an A. C. motor driving the coupling, first rectifier means connected to deliver D. C. power to the field coil of the coupling, a first magnetic amplifier having an A. C. power winding and a D. C. control winding, an A. C. power circuit connected to the rectifier means, the A. C. winding of the first magnetic amplifier being series-connected in the A. C. power circuit, a D. C. speed-control circuit connected to the control winding of the first magnetic amplifier, said control circuit including a D. C. voltage source providing a voltage responsive to the output speed of the coupling and adjustable speed-setting voltage means series connected in opposition with the speed-responsive voltage means and adapted to provide an adjustable speed-setting reference voltage which overrides the speed-responsive voltage, a second magnetic amplifier having an A. C. power winding and a D. C. control winding, a torque-control circuit connected to the control winding of the second magnetic amplifier, a torque-responsive D. C. voltage source connected in the torque-control circuit and coupled to the power supply lines for the A. C. motor so as to produce a D. C. voltage responsive to the current drawn by the motor, and an adjustable torque-setting reference voltage source connected in the torque-control circuit in series opposition with the torque-responsive voltage source and adapted to override the voltage of the torque-responsive voltage source, and a circuit connecting the A. C. power winding of the second magnetic amplifier to the said adjustable speed-setting voltage means.

4. A control as set forth in claim 3, wherein a capacitor is connected across the power winding of said first magnetic amplifier.

5. A control as set forth in claim 3, wherein each of said magnetic amplifier power windings has a capacitor connected in shunt therewith.

6. A control for varying the energization of an electrical load in response to a variable D. C. potential, comprising a magnetic amplifier having an A. C. power winding and a D. C. control winding, a D. C. power source connected to said control winding to supply a variable D. C. potential thereto, a power circuit including in series an A. C. power supply and said load and said A. C. power winding, and a capacitor and a resistor connected in series with one another to form a branch circuit, said branch circuit being series-connected with said A. C. power winding and shunt-connected across said load, the capacitance of said capacitor being sufficient to induce current of a saturation level to flow in said A. C. power winding, the resistance of said resistor being sufficient to inhibit oscillation and shorting effects of said capacitor, whereby time delay in the response of the electrical load energization to increases in said D. C. potential is reduced.

7. A control for varying the energization of a field coil of an electrical machine in response to a varaible D. C. potential, comprising a magnetic amplifier having an A. C. power winding and a D. C. control winding, a D. C. power source connected to said control winding to supply a variable D. C. potential thereto, a power circuit including in series an A. C. power supply and said field coil and said A. C. power winding, a first capacitor shunt-connected across said power winding, a second capacitor and a resistor connected in series with one another to form a branch circuit, said branch circuit being series-connected with said A. C. power winding and shunt-connected across said field coil, the capacitance of said first capacitor with respect to the inductance of said A. C. power winding being such as to produce parallel resonance at the frequency of said A. C. power supply when the variable D. C. potential is a minimum, the capacitance of said second capacitor being sufficient to induce current of a saturation level to flow in said A. C. power winding for a time period corresponding approximately to the time delay of said control winding, the resistance of said resistor being sufficient to inhibit oscillation and shorting effects of said second capacitor, whereby time delay in the response of the field coil energization to increases in said D. C. potential is reduced.

References Cited in the file of this patent

UNITED STATES PATENTS

| Number | Name | Date |
|---|---|---|
| 1,921,787 | Suits | Aug. 8, 1933 |
| 2,278,151 | Runaldue | Mar. 31, 1942 |
| 2,551,839 | Jaeschke | May 8, 1951 |